US007698818B2

(12) United States Patent
Voegele et al.

(10) Patent No.: US 7,698,818 B2
(45) Date of Patent: Apr. 20, 2010

(54) METHOD FOR ASSEMBLING PRECISION MINIATURE BEARINGS FOR MINISYSTEMS AND MICROSYSTEMS

(75) Inventors: Gerald Voegele, Sindelfingen (DE); Thomas Weisener, Schwevin (DE); Helmut Christmann, Birkenfeld (DE); Armin Reichardt, Birkenfeld (DE); Harald Helget, Birkenfeld (DE)

(73) Assignee: HNP Mikrosysteme GmbH, Parchaim (DE)

(*) Notice: Subject to any disclaimer, the term of this patent is extended or adjusted under 35 U.S.C. 154(b) by 467 days.

(21) Appl. No.: 10/466,792

(22) PCT Filed: Jan. 21, 2002

(86) PCT No.: PCT/EP02/00549

§ 371 (c)(1), (2), (4) Date: Aug. 4, 2004

(87) PCT Pub. No.: WO02/057631

PCT Pub. Date: Jul. 25, 2002

(65) Prior Publication Data

US 2005/0081366 A1 Apr. 21, 2005

(30) Foreign Application Priority Data

Jan. 22, 2001 (DE) ................................ 101 02 717
Sep. 22, 2001 (DE) ................................ 101 46 793

(51) Int. Cl.

| | |
|---|---|
| ***B23P 15/00*** | (2006.01) |
| ***B21D 51/16*** | (2006.01) |
| ***B21D 53/10*** | (2006.01) |
| ***B21D 53/28*** | (2006.01) |
| ***B21K 1/04*** | (2006.01) |
| ***F16C 23/00*** | (2006.01) |
| ***F16C 19/50*** | (2006.01) |
| ***F01C 1/02*** | (2006.01) |
| ***F04C 18/00*** | (2006.01) |

(52) U.S. Cl. .............. 29/898.07; 29/888.02; 29/890.09; 29/893.2; 29/898.048; 384/255; 384/447; 418/61.3; 418/166

(58) Field of Classification Search .............. 29/898.07, 29/898.051, 898.09, 898.048, 893.2, 893.1, 29/888.023, 888.02, 893, 890.09; 384/255, 384/447; 418/61.3, 166, 171
See application file for complete search history.

(56) References Cited

U.S. PATENT DOCUMENTS 3,303,783 A * 2/1967 Neubauer .................... 418/32

(Continued)

OTHER PUBLICATIONS

International Search Report, PCT/EP02/00549, mailed Jul. 10, 2002.
Patent Abstracts of Japan, vol. 1999, No. 14, Dec. 22, 1999—& JP 11 247761 A (Hitachi Ltd), Sep. 14, 1999 abstract.

(Continued)

*Primary Examiner*—David P Bryant
*Assistant Examiner*—Alexander P Taousakis
(74) *Attorney, Agent, or Firm*—Hunton & Williams

(57) ABSTRACT

The aim of the invention is to obtain a cost-effective solution for providing a microsystem with bearings, which have sufficiently high precision and long-term stress resistance. The invention proposes a method for manufacturing, adapting or adjusting a bearing portion in a fluidal microcomponent (M) comprising a stator (30) and a rotor (40,2). Said rotor is rotatably supported on the at least one bearing portion (L10, L11) relative to said stator. Said rotor (40,2) is rotatably supported by a sleeve (10, 11) inserted into said stator (30), for forming said bearing portion, the at least one sleeve being inserted in said stator as a bearing sleeve and comprising an inner surface and an outer surface (10*i*, 10*a*; 11*i*, 11*a*). Before being inserted in said stator, said bearing sleeve (10, 11) is a separate bearing component comprising an inner surface (10*i*, 11*i*) as an inner bearing surface, which is mechanically micro-finished before being inserted into said stator (30). The outer surface (10*a*, 11*a*) of said bearing component (10, 11) is mechanically permanently connected with said stator (30).

21 Claims, 6 Drawing Sheets

U.S. PATENT DOCUMENTS

| | | | | |
|---|---|---|---|---|
| 4,492,539 | A * | 1/1985 | Specht | 418/19 |
| 4,836,760 | A * | 6/1989 | MacLeod | 418/166 |
| 5,156,540 | A * | 10/1992 | Fernau et al. | 418/152 |
| 5,472,329 | A * | 12/1995 | Maynard et al. | 418/152 |
| 5,575,572 | A * | 11/1996 | Schaede | 384/585 |
| 6,053,718 | A * | 4/2000 | Schmidt et al. | 418/152 |
| 6,174,151 | B1 * | 1/2001 | Yarr | 418/171 |
| 6,179,596 | B1 * | 1/2001 | Weisener et al. | 418/171 |
| 6,244,839 | B1 * | 6/2001 | Cole et al. | 418/21 |
| 6,314,642 | B1 * | 11/2001 | Thompson et al. | 29/888.023 |
| 6,572,353 | B2 * | 6/2003 | Hansen | 418/61.3 |
| 6,592,348 | B1 * | 7/2003 | Johnson | 418/152 |

OTHER PUBLICATIONS

Patent Abstracts of Japan, vol. 1999, No. 13, Nov. 30, 1999—& JP 11 230055 A (Toshiba Mach Co Ltd; Nippon Oil Pump KK), Aug. 24, 1999 abstract.

Patent Abstracts of Japan, vol. 018, No. 034 (M-1544), Jan. 19, 1994—& JP 05 263757 A (Hitachi Ltd), Oct. 12, 1993 abstract.

Patent Abstracts of Japan, vol. 015, No. 208 (M-1117), May 28, 1991—& JP 03 056713 A (Babcock Hitachi KK), Mar. 12, 1991 abstract; figure 8.

FR 1 097 160 A (Hobourn Eaton Mfg Company Ltd) Jun. 30, 1955 the whole document.

DE 198 26 367 A (Geraete Und Pumpenbau GMBH DR) Dec. 23, 1999 claim 1; figure 2.

DE 37 37 358 A (Allweiler AG) May 18, 1989 claim 1.

* cited by examiner

METHOD FOR ASSEMBLING PRECISION MINIATURE BEARINGS FOR MINISYSTEMS AND MICROSYSTEMS

FIELD OF INVENTION

The invention relates to a method for at least one of manufacturing, adapting and adjusting a bearing portion in a mini to microsystem. Microsystems being disclosed in WO 97/12147 (Fraunhofer-Gesellschaft) for example as micropump or micromotor for conveying a fluid or for being driven by a fluid.

BACKGROUND

Due to the small nominal sizes for microsystems, in respect to which reference is made to the scale drawing of FIG. 1, bearings of outer wheels, inner wheels or shafts, which all together are designated as “rotors”, have to meet exacting requirements. Particularly for transporting (conveying or driving) non-lubricating media, it is necessary to use very hard and simultaneously corrosion-resistant materials, such as ceramic or hard metal. The application of said materials is useful for all tribologically stressed functional components of a microsystem, to avoid the use of soft or corrosive materials with a continuous or stronger abrasion. Abrasion in bearing portions, particularly having small and miniature dimensions in a millimeter range (mini to micro system), quickly results in a breakdown of the whole system.

Further, in view of such small nominal sizes, production engineering faces difficulties to constantly keep to the required high-precision dimensions. These dimensional accuracies are in a micrometer range, required accuracy being in the range of 1 to 2 μm. Particularly the use of eccentrically operating microsystems, comprising two rotors meshing with each other, so-called micropumps having internal teeth according to the gerotor principle, require a high-precise observation of the eccentricity, said eccentricity being obtained by two eccentrically positioned bearing portions. In addition to their radial offset, said bearings have an axial offset, but are located axially closely to each other. Thus, for principle reasons, the axes are eccentrically offset relative to each other. Said eccentricity requires a precision in micrometer range, said precision being expensive and complex, if not impossible from the production-engineering point of view, when using metal cutting manufacturing methods with a usual housing structure.

SUMMARY OF INVENTION

It is therefore an object of the invention to propose a cost-effective solution for providing a microsystem of the kind illustrated for example in FIG. 1 with bearings having the required maximum precision and a long-term stress resistance, particularly when operated with non-lubricating fluids.

According to the invention, a mechanically precise joint system comprising simple, precise bodies (sleeves) and a “not precisely” manufactured housing (stator) is cost-effectively assembled by a connecting technique (soldering, gluing, friction-setting), particularly in connection with two axially spaced apart bearings or bearing portions and in a dimension of the “rotors” to be bearingly supported in a diameter range of below 15 mm, whereby larger embodiments shall not be excluded, but smaller diameters meet an increased attention.

Within the scope of the specification of the invention, reference is made to both, a microsystem and a method for manufacturing a bearing portion of said microsystem, said method describing the microsystem negatively with respect to spaces and bearing portions being provided, into which said microsystem can then be positively inserted. As far as the microsystem itself is concerned, the finished state is described, in which the manufacturing method is only indirectly perceivable, as can be seen from the subsequent specification in support of the claims.

It should be first mentioned that the term of a hard bearing material is compared to that of a “soft” stator material. Said terms are to be understood such that said hard bearing material is for example ceramic or hard metal, for ensuring a long-term stress resistance and a long-term precision of said at least one bearing portion. Said softer stator materials, which can be processed more easily by cutting and which can be obtained at a lower cost and processed more easily from the production-engineering point of view, are understood in contrast to said hard materials. The softer stator materials receive the substantially small bearing components that provide the precision and abrasion resistance equired for achieving the inventive object.

The stator comprises at least one portion made of a material that can be processed more easily by metal cutting, said stator receiving at least one bearing body made of a hard material. In said bearing body, preferably a sleeve, a rotor is bearingly supported either as shaft, or as outer rotor, or as inner rotor. p Between said hard material and said stator material, there is a portion providing the mechanically permanent connection, which portion can be obtained in three ways. When a portion of the housing material in the bearing portion is displaced by a mechanical friction-setting operation, a direct, mechanically permanent connection is obtained for bearingly supporting the bearing component such that after insertion, a mechanically permanent connection between said bearing component and said stator is obtained and that said bearing component is precisely aligned. An alternative variant for obtaining said mechanically permanent connection is a hardening of a filling material during a period of time, said filling material being inserted into a gap, which is present between said bearing component and a slightly larger inner size of the receiving portion of said stator. Said gap can be in a range of between 20 μm and 70 μm, particularly below 100 μm. After said hardening, a connection of materials is obtained, which is manufactured mechanically permanent, with a long-term stress resistance, and precisely with respect to its position. Further, the realization of said at least one bearing portion thus formed is cost-effective. A third variant is a combination of the two above-described methods, when two axially spaced bearings are provided. Then, said friction setting with a mechanical pressing operation with a mechanically direct permanent connection for a bearing support of said first bearing component can be combined with a hardening of a filling material between said second bearing component and said stator. Initially, the first bearing is inserted by friction setting, mechanically displacing said soft material. Subsequently, the second bearing is put initially loosely into the stator, supported by said mechanically already permanent bearing, the center of which is axially spaced apart. Subsequently, a positioning of said second bearing relative to said first bearing, and thus an absolute positioning of said second bearing relative to said stator follows, and a hardening filling material is inserted between said second bearing and said stator, with which filling material the hardening and permanently fixing during a period of time is realized. An adhesive effect is obtained in a gap, which is left between said second bearing and said stator, as described above.

Preferably, the first bearing portion, which is positioned mechanically by displacing a surface portion of the stator material, is that of a shaft, the outer diameter of the sleeve, which forms said bearing portion, being smaller than the sleeve, which forms the subsequently determined second bearing portion, which is accurately positioned by the hardening of a filling material.

The displacement or the portion filled up with a hardening material is the portion, which is to be described as "non-fitting portion", "not properly dimensioned fit" or "misfit."During the manufacturing process, said misfit or not properly dimensioned fit becomes a fit. The non-fitting portion is obtained either by a mechanical displacement of a portion of the stator material, or said misfit becomes a mechanically permanent connection by providing a hardening intermediate material, which, as filling material realizes said mechanically permanent connection.

During friction setting, said bearing body is guided high-precisely during the entire friction setting operation, to obtain an accurate position in said stator. During said mechanical guiding and displacement process, at least the surface of the stator portion, which receives said bearing component, is modified, particularly more than the surface or a radial portion is displace.

The hardening of a filling material operates without displacement, the bearing component being supported accurately positioned during hardening, to make said mechanically permanent connection an accurately positioned precise connection.

Said at least one bearing body, which, before finishing the fabrication, was a bearing body separate from said stator and made from a different material, is processed by mechanical micro-finishing of the inner surface, for example by grinding, honing or lapping, to obtain a suitable bearing support surface for the shaft or the outer rotor. Particularly rotationally symmetrical bearing bodies are suited for grinding operations, such as centerless grinding, and can be manufactured comparably inexpensively in the required precision. Additionally, grinding allows processing of hard materials without restriction, the material selection thus not being limited. After high-precisely manufacturing the bearing support surfaces, the mechanical connection with the stator is carried out, the insertion of the bearing sleeves and their relative alignment, particularly by gluing or friction setting, being effected with a separate arrangement, said arrangement defining the position and orientation of said one bearing portion, particularly two eccentric bearing portions, and realizing the required tolerances with a comparably low effort or cost.

Prior to a hardening of the solder or the adhesive substance, the sleeves can be adjusted relative to each other, so that said sleeves initially float and are aligned in said gap filled with adhesive.

A supporting arrangement serves for stabilizing the position and for securing it during the proceeding hardening of said solder or adhesive.

The manufacturing method advantageously limits the variety of parts of a modular system of parts comprising different rotor sizes of the tooth ring pump, since identical bearing bodies can be used for different tooth systems—defined by the eccentricity and the tooth parameters.

Friction setting is done with a slight press fit, the manufacturing tolerance of a "not sufficiently precise" stator, e.g. a stator manufactured by cutting (by a metal cutting method) defining the oversize of the fit. As the tolerance of the position of the negative mold in the housing does usually not correspond to the position of the corresponding bearing bodies, the material is displaced during the friction setting operation. In most cases, said operation occurs asymmetrically and is enabled by the roughness and by a defined small supporting portion on the surface of the negative mold. The roughness of the surface to be produced is adjusted such that tips of the surface, which carry the bearing body to be pressed in, can be displaced relatively easily. Alternatively, the surface results from a defined axial or radial structure (comparable to a peg). The radial offset to be compensated between the bearing body and the portion of the stator receiving said bearing body can be around 10 μm to 20 μm.

The principle of said bearing support can also be transferred to other mechanical systems with defined bearings, such as pumps having external teeth, etc., so that the invention does not imperatively relate to axes with two bearing portions only.

A rough determination of the position of the bearing bodies is inexpensively predetermined by metal cutting methods (lathing, milling or the like) or basic (original) shaping (e.g. by injection molding), reshaping or other manufacturing methods. The recesses (negative molds) have dimensions of a limited precision, thus possibly having larger tolerances than directly provided bearing portions. This already reduces the manufacturing cost, to subsequently obtain the precise and accurate position of the bearing bodies relative to each other by using the assembly arrangement, which high-precisely positions the hard bearing bodies in the comparably soft stator and determines their relative position and alignment with a micrometer accuracy.

A separate substantial assembly arrangement, which is described hereinafter, is of decisive influence for all assembly operations. Due to its geometry, which is of micrometer accuracy, said assembly arrangement defines the eccentric position of the sleeve axes relative to each other and stabilizes said position during the assembly operation, either during friction setting or during the supporting time, during which the adhesive material hardens.

The bearing support is designed to correspond to a so-called flying (unilateral) bearing Support. Said unilateral bearing portion is closer to the drive means than the backside of the bearing support, which is occupied by the microsystem. Said unilateral bearing support allows reducing the number of bearing portions requiring precision. Therefore, by using a bearing sleeve receiving a rotor (outer rotor, inner rotor or shaft), a radial bearing support of the rotating functional element can be ensured. When two bearing supports that are arranged eccentrically relative to each other are provided, the bearing body serves as an axial support for the outer rotor of the microsystem for forming the shaft bearing. With respect thereto, the inner diameter of the bearing body for the shaft is smaller than the inner diameter of the bearing body for the outer rotor of the micro system. As also the outer diameter of the bearing body for the shaft is larger than the inner diameter of the bearing body for the outer rotor, an axial bearing surface is obtained. Thus, the outer rotor (and the inner rotor) is in surface contact with the axial face end surface of the bearing component having the smallest inner diameter. A strip is formed between said two bearing components, said strip not having a constant width in a circumferential direction due to the eccentricity.

The eccentric sleeves are in surface contact with each other along their complete circumference (on at least one inner surface) and are particularly mounted on an axial end portion, i. e. on a face end surface of the stator. On the other end of the stator, a coupling arrangement is provided, said coupling arrangement establishing a connection with a motor arrangement in the sense of a drive means.

When speaking of a radially offset bearing support and of an axially offset bearing support, reference can be made to the respective centers. As far as said radial offset is concerned, the axes are offset relative to each other, said offset being represented by the parameter dr. An axial offset corresponds to a distance of the centers of the bearing portions, said distance being designated dL. Said two bearing portions themselves, however, have a final axial length and are closely neighboring each other, particularly are directly adjacent to each other.

The only spatially limited dimension of the bearing portions also allows the use of highly special and expensive materials for said bearing portions, without insubordinately increasing the cost of the entire system.

In a mechanical micro-finishing operation relating to the separate bearing component, which prior to inserting comprises a surface suitable as an inner bearing surface, a rectangularity of said inner bearing surface relative to a face end of said bearing component can be observed. Rectangularity is advantageous for an additional auxiliary support in the sense of a mechanical support portion during the assembly of the bearing portions.

Another adjusting possibility is given in an axial direction, when a first supporting portion as a first bearing portion is already finished. The height (measured in an axial direction) of the bearing portion for receiving said rotor, i. e. the second bearing portion, can be adjusted by manufacturing engineering relative to the stator to obtain a defined face end clearance. Said face end clearance refers to the rotor inserted later, which is rotatably supported in said second bearing portion. With said face end clearance, the friction and the fluidal bearing can be predetermined. The inner opening of the stator, into which said at least one bearing portion, preferably two axially spaced apart bearing portions are inserted, comprises two portions, each forming an inward directing surface. Said surfaces are the surface portions not yet suited for a bearing support, onto which the bearing portions are mounted by said bearing sleeves, which from a production-engineering point of view are more precise, namely by a gluing or pressing method or by a combination of said connecting techniques. Said two surface portions of the raw bearing are already eccentrically aligned relative to each other to form a respective axis each, said axes having an axial distance "dr" in a radial direction.

The inner receiving portion therefore has two functional portions for receiving two functionally different bearing portions, each comprising a respective bearing body. A compensating function by friction setting or gluing has an effect only in a very small dimensional range, an eccentricity being dependent on the toothing, for example 180 μm, in which example a gluing gap is in a range of 70 μm at maximum and a pressing oversize is around 10 μm.

BRIEF INTRODUCTION TO THE DRAWINGS

The claimed invention is described in detail and supplemented by embodiments.

FIG. 1 is a full scale illustration (1:1) of the complete microsystem 1, said micro system comprising a fluid connection F, the proper fluid transporting micro component M, e.g. as pump having a motor drive A, or as fluidal motor M having a drive means A.

FIG. 1*a* is an exploded and considerably enlarged view of FIG. 1, illustrating all components, which are to be described in more detail in the following, said micro component M comprising an inner rotor 3 and an outer rotor 2, said inner rotor being mounted on a shaft 40. Said micro component is described in more detail in the above-mentioned WO-document and is therefore designated as gerotor system or as tooth ring system having internal teeth, said teeth being in a meshing engagement during rotation.

Figure 3:
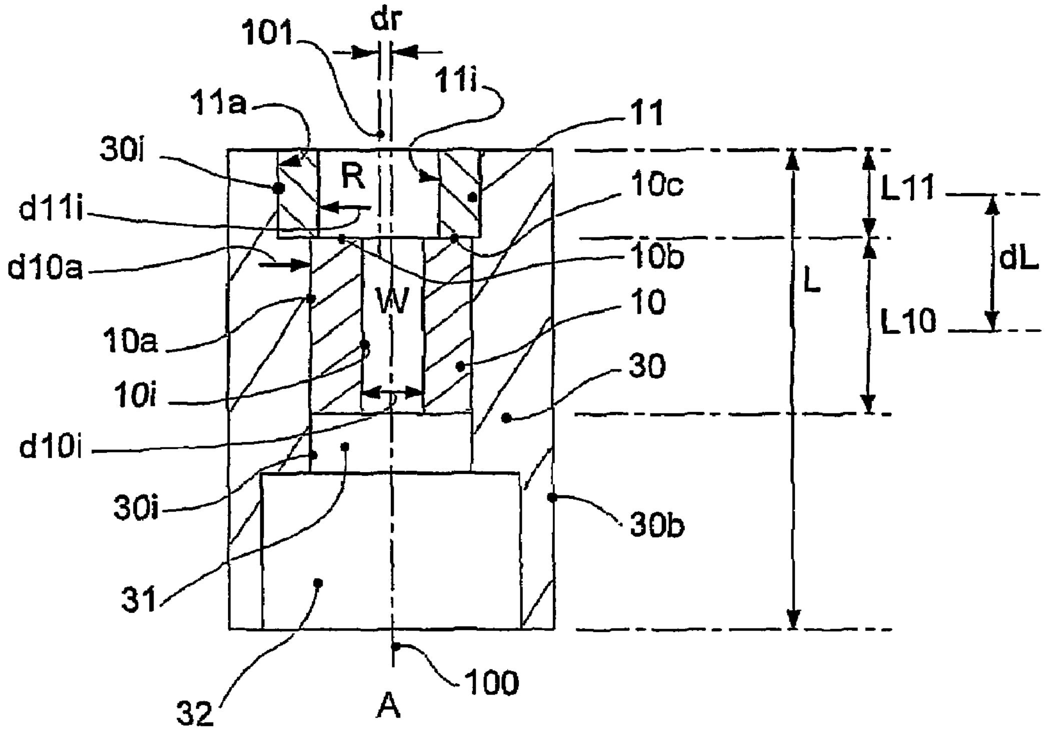
FIG. 3 illustrates a section along a center axis of the system according to the above figures, only a stator 30 being schematically displayed as a housing, for illustrating sleeves 10,11 mounted therein as bearing portions.
Figure 3A:
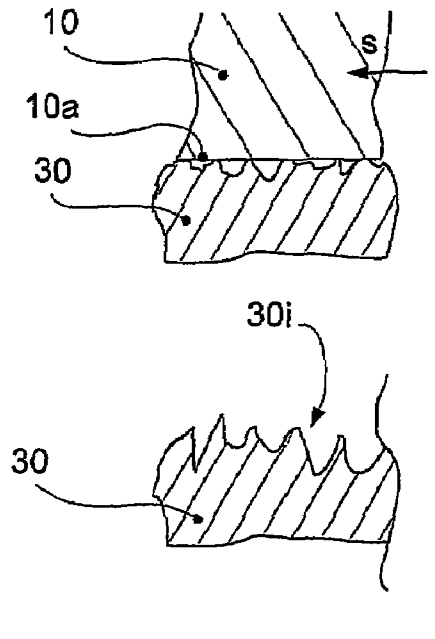

FIG. 3*a* illustrates surfaces 30*i* and 10*a* of a bearing sleeve 10 and a stator 30 before and after inserting said sleeve.

Figure 4:
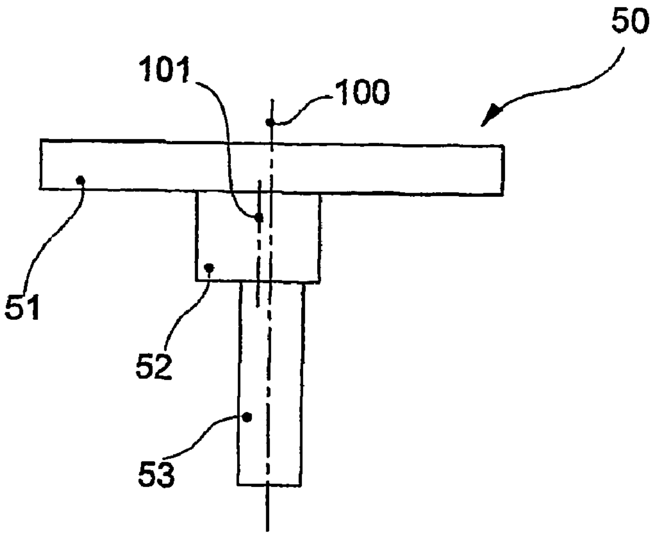

FIG. 4 shows a supporting and positioning system 50 for inserting said sleeves 10,11 according to FIG. 3.

Figure 5:
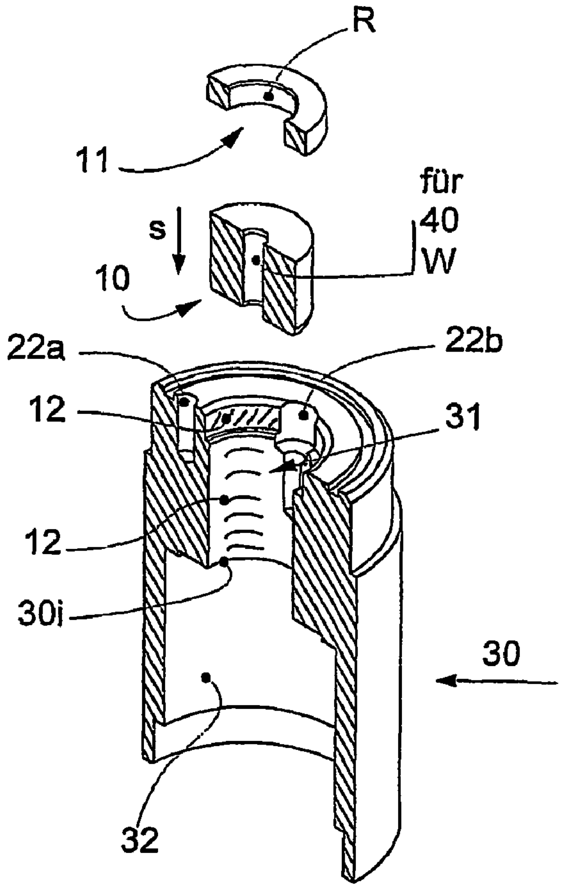

FIG. 5 is a perspective view of FIG. 3, showing said stator and, still spaced apart, i.e. before being mounted, a first sleeve part 10 and a second sleeve part 11 for receiving said shaft 40 in a shaft space W and an outer rotor of said micro system in a rotor space R. Said two parts are inserted into a provided inner space 31 of said stator in a direction s.

Figure 6:
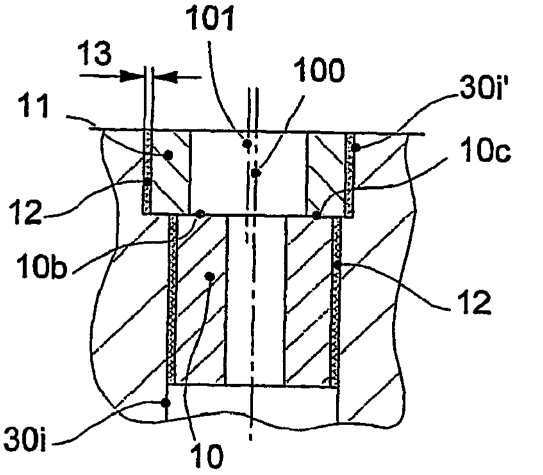

FIG. 6 illustrates an alternative adjustment and permanent fixing of said sleeves 10,11 of FIG. 5, compared to FIG. 3*a*.

Figure 7:
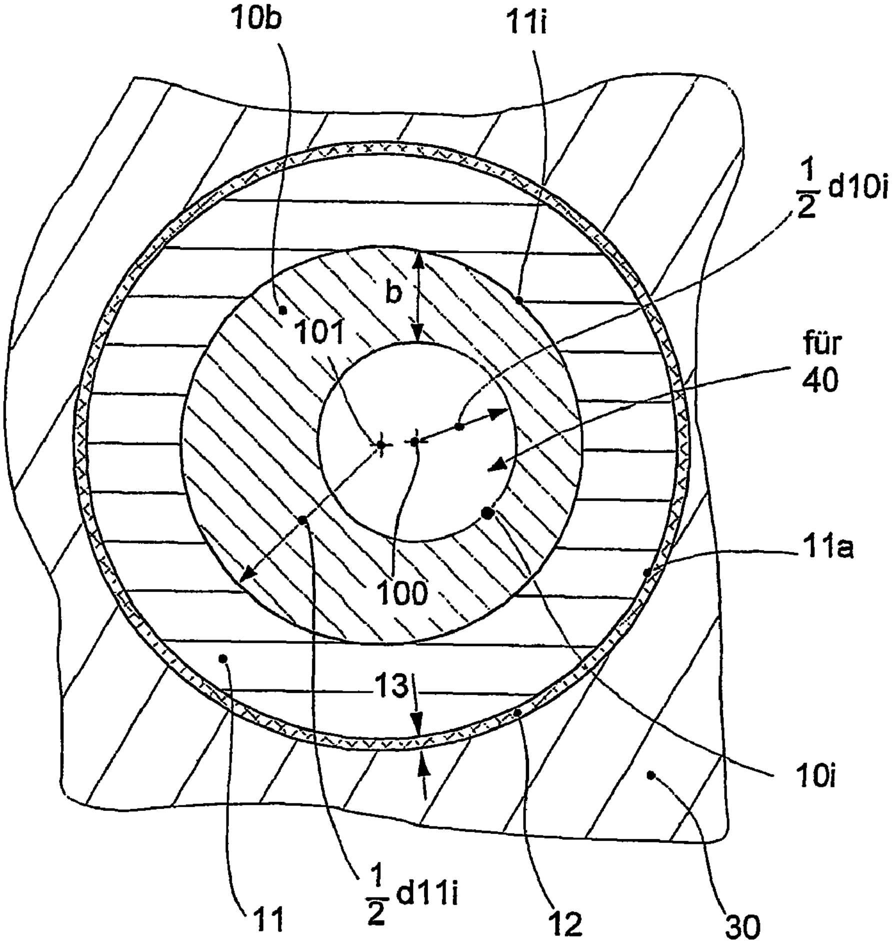

FIG. 7 is a top plan view of FIG. 3 in an axial direction, still without an inserted rotor and without an inserted shaft 40, for illustrating an axial bearing and supporting surface 10*b*.

DETAILED EXPLANATION OF DRAWINGS

Figure 1:
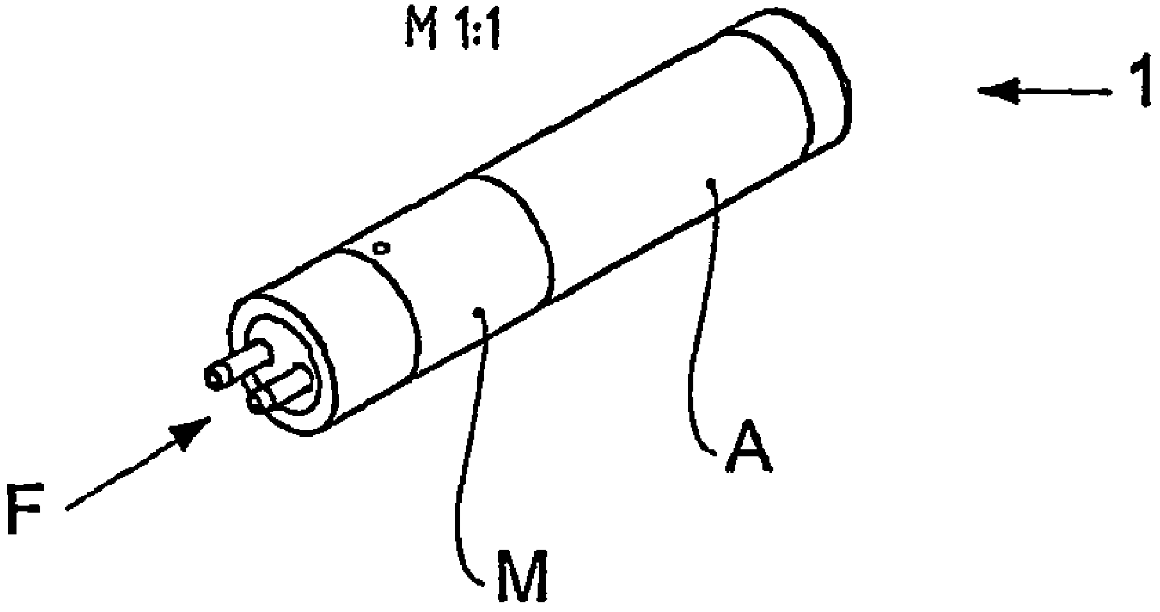

The full-scale illustration of the microsystem according to FIG. 1 shows the requirements with regard to a miniaturization and the necessity of manufacturing bearings provided in said system with an extremely high precision and of ensuring their stress resistance and abrasion resistance.

Figure 1A:
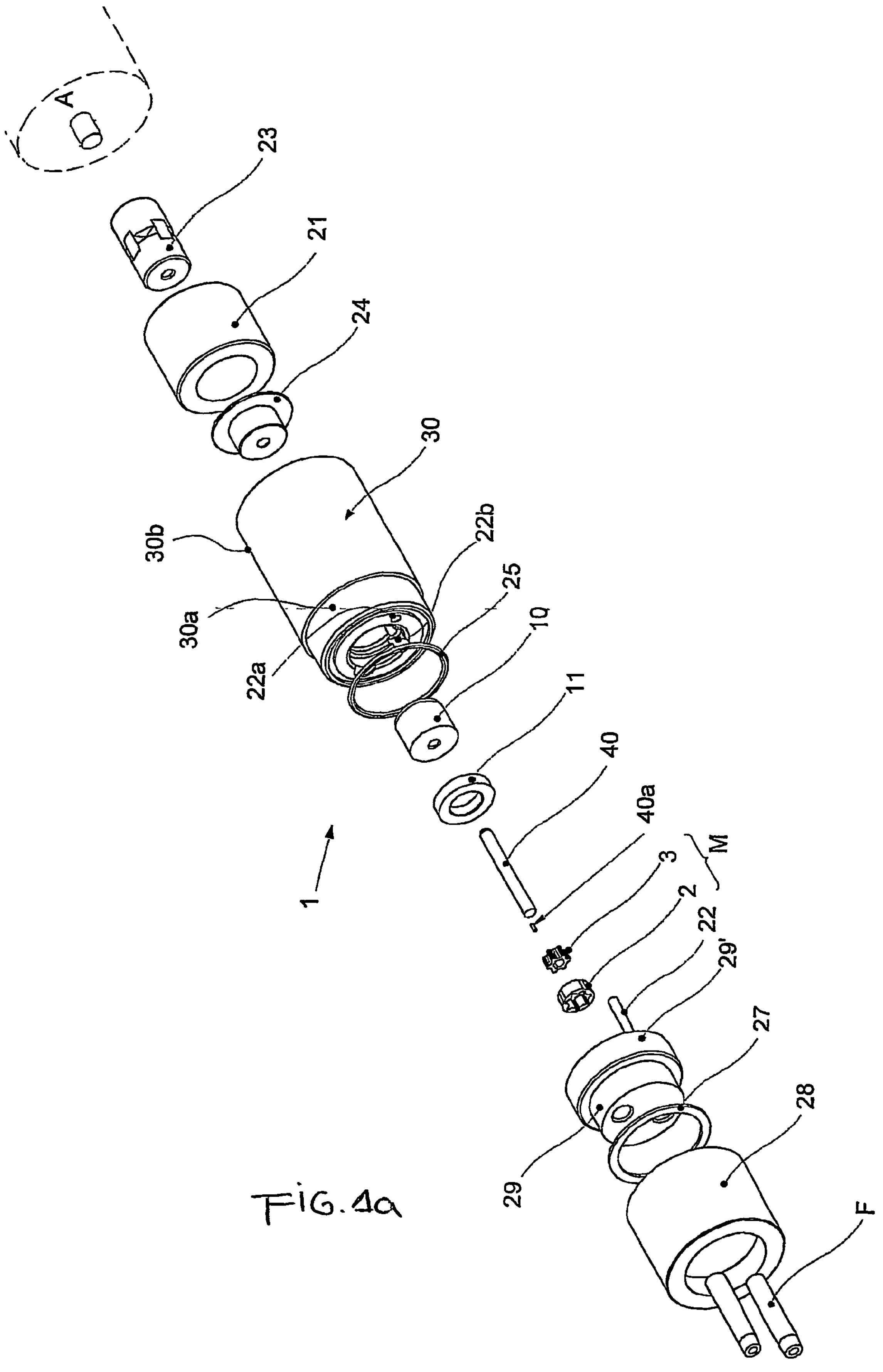
Figure 2:
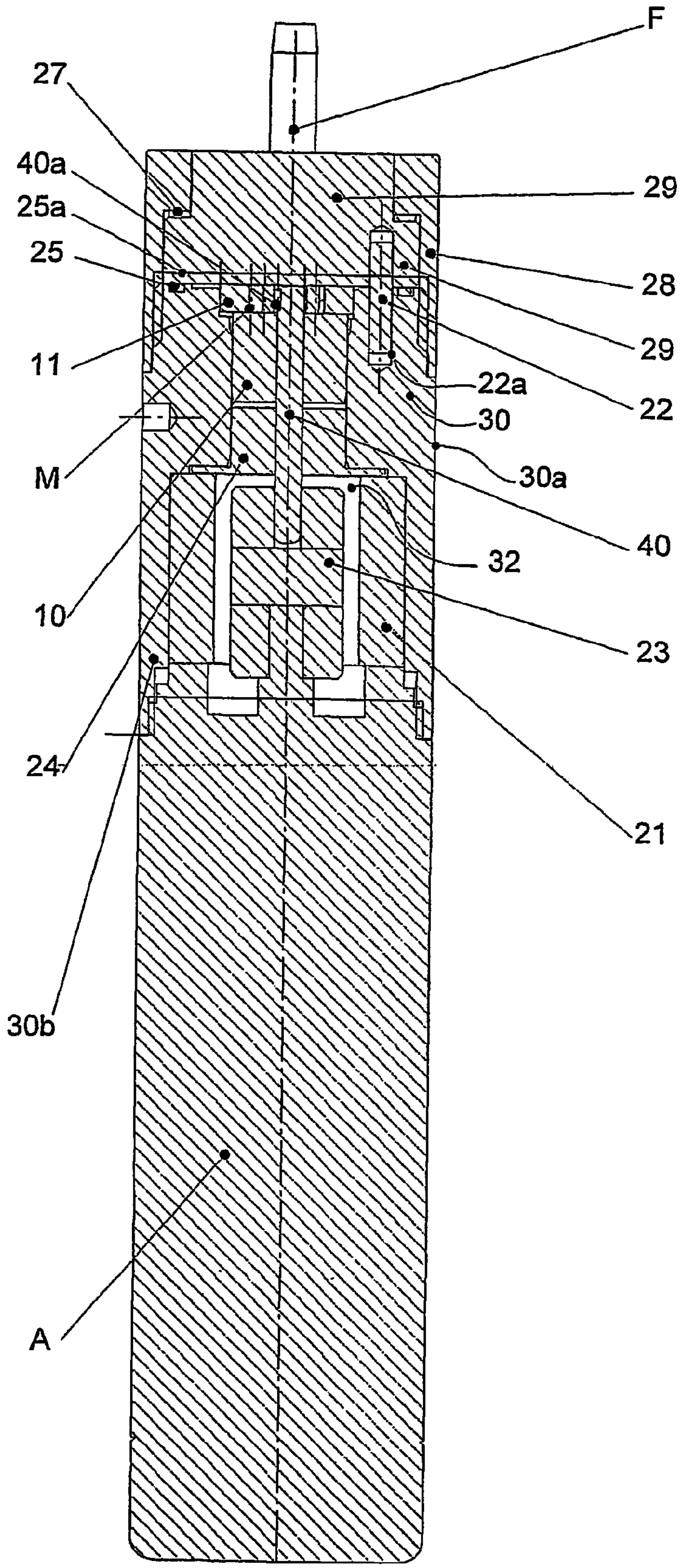
FIG. 2 is a sectional view along a main axis of FIG. 1*a* and illustrates an assembly of a tooth ring system with all components.

FIGS. 1*a* and 2 are explained together for providing an insight into the microsystem illustrated in FIG. 1.

The largest portion is occupied by a drive system A, which is connected with a micro component over a flange portion. A shaft of a motor is connected with a shaft 40 of said micro component over a coupling means 23, said connection being non-rotating. An inner space 32, provided for this purpose, is limited by a sleeve 21, said sleeve having a longer axial extension than a length of said coupling means 23. At said shaft 40, a first hat-shaped gasket 24 is provided, said gasket having a collar-shaped protruding thin flange portion and an opening for a passage of said shaft 40. Said gasket is positioned in an axial inner space 31, in which also a first bearing sleeve 10 is located, said bearing sleeve also having an inner opening, in which said shaft 40 is suitably supported for rotation.

Above said first sleeve 10, a second sleeve 11 is provided, said second sleeve having a larger outer diameter and a lager inner opening, for receiving a rotor or rotors 2,3 of said microsystem M, one of which rotors being non-rotatably positioned over a pin 40*a* on said shaft 40.

When rotating said shaft, both internally toothed rotors rotate with said shaft, for which rotation an outer bearing support of the outer toothed ring at said second sleeve 11 is provided.

Said second sleeve 11 has a considerably shorter axial extension, but a larger radial inner opening, whereas said first sleeve 10 comprises a small opening suitable for said shaft, but extending over a larger axial length.

The described micro component is generally marked with M, but it comprises said two internally toothed rotors 2 and 3, as illustrated in FIG. 1*a*.

Said sleeves 10,11, said gasket 24, and said shaft 40 are received in a stator 30, which can be regarded as a portion of the housing. Said stator comprises a longitudinally extending flange portion 30*b*, extending outside over a distance sleeve 21 and engaging at an edge of said drive A for fixation, and a further above located portion 30*a* in which said micro system M and said shaft 40 are supported. The stator 30 is directly screwed up with the motor. For this purpose, small size electric motors comprise standard threads or connection holes, over which motor drives are usually fastened.

The inner opening of said second sleeve 11 for receiving said micro system M is disposed in said stator at a face end thereof. Said sleeve can be mounted flush with respect to the face end of said stator 30. Preferably, however, a slight projection can be provided to obtain a better sealing effect at the rotors, when a portion 29,29', located above said rotors and comprising a fluid guiding means towards the connections F, is pressed with a higher pressure over a screwed flange 28 against said stator 30 with an intermediate sealing ring 25 and a kidney plate 25*a*. Between said screwed flange 28 and said stator 30, preferably a left-hand thread is provided, which is disposed outside. A special claw tool is used for screwing, said claw tool engaging in a lateral bore. Thus, an unauthorized opening is avoided. Said portion 29,29' comprises fluidal control contours (inlet opening and outlet opening) and is aligned exactly (radially and circumferentially) with its lower portion 29' over a cylindrical pin 22 for engaging in a fit opening 22*a* in said stator 30, and, if required, in a collar at said stator 30.

The described flush contact of the lower portion 29' of the fluid transporting portion 29,29' with its surface extending towards said drive with said rotors of the fluidal system M is improved by providing a compensating ring 27 between the clamping arrangement 28 and said fluid transporting portion 29. Said compensating ring 27 is made of a soft material, for example aluminum, copper or plastic, and provides a plane-parallel and flush contact of said portion 29' with said stator, which is also provided with an O-shaped gasket 25 or an additional disk or plate 25*a* with fluid transporting kidneys, particularly also contacting the outward-directing face end surfaces of said rotors, for obtaining a better sealing effect. Said better sealing effect is achieved by a higher surface pressure (a more solid seat/contact) of said fluid transporting portion 29' against said second sleeve 11, said better sealing effect being favored by said soft compensating ring 27.

From the above description, three constructive portions can be taken. A fluid transporting portion F comprising the components 28,29,29', which can also be regarded as stator. The proper stator 30 at a portion 30*a*, for receiving a microsystem, said stator comprising an adjacent coupling portion 23 of a shaft 40 at a portion 30*b*. Said portion is attached to a drive portion A.

It is emphasized that in said stator, a separation of the fluid transporting portion 28,29,29', F from said microsystem takes place, said separation being provided by the assembly and positioned at a face end of the rotors of the microsystem, said face end directing away from the bearing side. In other words, the stator 30 is structured such that the bearing support is positioned flush at a face end directing away from said drive A, so that a mounting of said fluid transporting portion 29,29' is directly adjacent to the fluidal micro component and ensures a fluid transport and functional operation of said micro component M by a provided fluid conveying structure comprising kidneys and bores.

The above general view is intended to increase the understanding of the constructive design and structure of a microsystem according to FIG. 1. In the following, details are explained, which particularly describe the mounting and assembly of the first and second sleeve 10,11 according to FIG. 2, reference insofar being made to FIG. 3.

FIG. 3 is a section through an axis of the system according to FIG. 2, two axes 100 and 101 being shown, said axes being offset relative to each other. Said offset of axes is marked with dr. Said axis 100 is the axis of the first sleeve 10, said sleeve having a length L10. Said sleeve is made of a hard material, e.g. hard metal or ceramic. Initially, it is not inserted in the stator 30, said stator having an elongated opening 31 for receiving said sleeve, a lower portion of said opening having an inner surface 30*i*. Said inner surface is schematically illustrated in FIG. 3*a* (in the lower part of the illustration). Said surface is of considerable roughness, which can be obtained by a metal cutting method. Said surface does not have to be particularly precise and can be embodied even larger than illustrated in FIG. 6.

Likewise, a further receiving portion is provided, said receiving portion being disposed axially above in said stator 30 as part of said opening 31, for receiving said second sleeve 11, which can also be made of a hard material, such as ceramic or hard metal. Said sleeve, too, is initially not inserted.

The use of hard materials in contrast to “soft” materials of said stator 30 protects the bearing sleeves against abrasion. Said bearing sleeves are of small spatial extension, so that also expensive materials can be used. Said bearing sleeves are preferably designed as hollow cylinders and comprise an inner space each, for receiving the respective “rotor”.

Said first sleeve 10 has an inner space with an inner surface 10*i* for receiving a shaft 40. Said inner space is marked with W and has a longitudinal extension corresponding to said sleeve length L10.

The axially adjacent second sleeve 11 is provided for receiving and supporting the outer rotor 2. In respect thereto, said sleeve has a rotor-receiving portion R, a diameter d11*i* of said rotor-receiving portion being larger than a diameter d10*i* of said shaft space W. An inner surface 11*i* is designed to allow a bearing support of said rotor. The inner surface 10*i* of the first sleeve 10 is also designed to allow a bearing support of said shaft 40.

Both surfaces have a high precision and are designed for their respective bearing support function by grinding, eroding, honing, or lapping.

An inserting arrangement according to FIG. 4 is provided for inserting said two bearing sleeves into the respective axial portion of the opening 31 of said stator 30 with said inner surface 30*i* and said inner radially larger surface 30*i'*.

The two sleeves 10,11 are spatially geometrically aligned relative to each other by place holders 53,52, thus ensuring a high precision. Said two place holders 52,53 are spatially fixed relative to a support plate 51. The placeholder 52 for the outer rotor receives said second sleeve 11, said placeholder filling up the rotor geometry of the rotor space R. The second placeholder 53 for the shaft 40 is axially longer. Said second placeholder fills up the shaft space W and locates the first sleeve 10 spatially geometrically, to obtain the two spaced apart axes 100,101 for an eccentric bearing support of said microsystem M comprising two rotors. A not illustrated pin at said support plate 51 provides an absolute determination of the position of said support plate in relation to said stator 30, for engaging in an opening 22*a*.

After mounting said sleeves 10,11 on said inserting arrangement 50 and said two placeholders 52,53 which are radially offset by “dr”, a mechanical arrangement (not illustrated) is used for axially moving said inserting arrangement into said opening 31 of said stator 30, said movement being geometrical and precise, even high precise with regard to the masses. The movement path s or the movement direction s, is shown in FIGS. 5 and 3*a*. Due to the dimensioning and the surface structure of the two sleeves 10,11 and of the inner surfaces 30*i'* and 30*i* of the stator, a modification of at least the inner surfaces of the stator 30 occurs, said modification being visible in FIG. 3*a* prior to and after inserting said sleeve part 10. The rough surface of the not high-precisely manufactured inner surfaces is leveled or even removed or displaced, the soft material being modified on the surface, but simultaneously applying mechanical forces for spatially geometrically fixing said pressed-in sleeves 10,11, which serve as bearing support pieces.

The inner surfaces 11*i*,10*i* of said two sleeves are high precise, and after inserting, geometrically precisely fixed to achieve their bearing function.

The outer surfaces 10*a* and 11*a* of the two sleeves enter into a mechanical connection with the inner surfaces 30*i*' and 30*i* of the stator, when the inserting arrangement 50 is axially introduced under pressure.

An alternative fixation can be provided by a hardening substance 12, when the inner surfaces 30*i*' and/or 30*i* are designed to have a slightly larger spatial geometry than the outer surfaces 11*a* and/or 10*a* of said sleeves 10 and/or 11, as illustrated in FIG. 6. In this case, said inserting arrangement cares for an attribution of the eccentrically offset axes 100, 101 of said two sleeves, and positions them in the inner space 31 with the two eccentric portions 30*i*,30*i*' of the stator 30 until an introduced hardening substance 12 fills up a gap 13 for fixing it, and mechanically fixes said sleeves.

A solder or a bonding agent can be used as hardening substance; said first material hardens by a decreasing temperature, said second material by a chemical reaction.

One function of said inserting arrangement is to take over the mechanical attribution during the axial friction setting. Regarding the variant of fixation with a hardening substance in a gap 13 (also as an irregular interspace), said gap having a size of between 20 μm and 70 μm, said inserting arrangement takes over the geometrical fixation of the sleeves during hardening, therefore, during insertion, said inserting arrangement does not have to apply an additional mechanical force in a direction s.

The second sleeve 11 is axially shorter and has an axial length L11. The total stator length is L. Said stator 30 having an axial length L, the total of said two sleeve lengths L11 and L10 is still shorter than said stator length. The distance of the centers of said two sleeves is dL, which represents an axial offset, the face end surfaces of said two sleeves 10,11, however, contacting each other. Said contact of the two face end surfaces is described with reference to FIG. 7.

FIG. 7 illustrates a top plan view in an axial direction 100,101 from above (regarded from FIG. 3 or FIG. 6), the inner spaces R and W for the outer rotor and the shaft still being open, thus no shaft 40 and no rotor 2 or 3 of a microsystem M being inserted yet. A face-end bearing surface 10*b* is visible, which is also marked in FIG. 3 and in FIG. 6. Said bearing surface has a width b, said width not being constant in a circumferential direction, which results from the offset dr or Δr of said two axes 100,101, and from the two selected diameters of the sleeves, here the outer diameter d10*a* of the longer sleeve 10 and the inner diameter d11*i* of the shorter sleeve 11. Said diameters and the corresponding radii as respective half diameters, as well as the radial offset (eccentricity) are selected such that one of the hard bearing components 10,11 forms an annular axial support surface 10*c*, which is outside of a surface 10*b* and completely continuous also in a circumferential direction, and on which the other hard bearing component 11 is supported to have surface contact.

When observing said radial offset dr, the outer diameter d10*a* of said sleeve 10 is as much larger as the inner diameter d11*i* of said sleeve 11 that at no circumferential position, the soft material of said stator 30 as a portion of said support surface 10*b* for said rotor 2 according to FIG. 1*a* and possibly also for said inner rotor 3 according to FIG. 1*a*—regarded in an axial direction—appears or is of importance. The rotor or the rotors are—inserted in said rotor space R—then axially safely supported, geometrically precisely fixed, and a good sealing is obtained at the surface 10*b*, whereas the annular portion 10*c*, which supports said sleeves 10 and 11 relative to each other and aligns them orthogonally, is no longer visible from outside.

Inner surfaces 11*i* and 10*i* form bearing surfaces for the shaft 40 and the outer rotor of the fluidal microcomponent M, for serving as a slide bearing. Said annular surfaces 10*c* and 10*b* together form the axially directing face end surface of the complete bearing component 10 provided for said shaft. Said inner portion 10*b* serves for supporting and aligning the microsystem, and the surrounding outer portion 10*c*, which is located on the same level, serves for aligning and supporting said second bearing component 11.

The top plan view according to FIG. 7 also illustrates the gap 13 according to FIG. 6, said gap already being filled up with an adhesive or a solder 12, for fixing the inserted sleeve 11 relative to the softer material of said stator 30. Before said solder or adhesive hardens, said sleeve 11 was aligned by contacting at said outer annular surface 10*c* of said lower sleeve 10, so that the axis 101 of said sleeve is also aligned precisely in parallel to the axis 100. Said precise alignment results from a high-precise manufacturing of the face end surfaces, which extend exactly perpendicularly to said axes and are thus adapted to have a direct effect on the positioning and exact position. In an embodiment of specific dimensions, which, however, are not to be understood as restricting, a sleeve 10 was manufactured having an outer diameter of 5 mm and an inner diameter of 1.2 mm. An outer rotor 2 has an outer dimension of 3.8 mm, and is therefore—also when the selected eccentricity of the two axes 100,101 is considered—within the outer dimension of 5.0 mm of said sleeve 10, axially supporting said rotor for providing a rotatable bearing support. From said dimension, also the inner size d11*i* of said second sleeve 11 is visible, corresponding to the outer size of said rotor, for radially supporting said rotor with an annular bearing. Both bearing supports, which are perpendicular relative to each other, the inner wall surface 11*i* and the axially directing support surface of the sleeve 10 provide a precise alignment and precise bearing support of the rotor component 2.

A gap 13, which for explanatory purposes is illustrated in an oversize in FIG. 7, results from the difference between the radius of the inner surface 30*i*' of the stator 30, compare FIG. 3, and the outer dimension of the outer surface 11*a* of the hard bearing sleeve 11. For a bonding, the size of said gap is preferably between 50 μm and 70 μm, which, when illustrated to scale, would not be visible in the illustration according to FIG. 7, if it had not been represented at a substantially enlarged scale.

FIG. 5 is a perspective view showing the insertion of the two bearing sleeves 10,11, used for an assembly and adjustment of the sleeves with an adhesive substance. An adhesive substance 12 is introduced into a gap 13 having a size of between 20 μm and 70 μm with reference to a respective inner diameter of said stator 30 at the surfaces 30*i* and 30*i*'. The inner space 31 for receiving said first sleeve 10 is longer than said bearing sleeve 10. The corresponding difference—as illustrated in FIG. 2—is occupied by a radial shaft sealing 24, which is fixed against said motor A by a distance sleeve 21. An inserting path s of the two bearing sleeves 10,11, supported by an inserting arrangement 50 according to FIG. 4, provides a precise positioning. After filling in an adhesive substance 12, which can also be present at said inner surfaces according to FIG. 5 already prior to said insertion, a spatial geometrical attribution and an absolute positioning of said sleeves 10,11 is maintained for at least the hardening time of said adhesive substance or solder, until a mechanical hardening occurs.

Also visible from FIG. 5 is a receiving portion 22*a*, in which a positioning pin 22 according to FIG. 2 engages, when mounting a fluid transporting portion 28,29,29'. A radially offset stepped bore 22 at the inner side of the surfaces 30*i'* and 30*i*, respectively, of said stator 30 is provided. Circumferentially spaced apart from said receiving portion 22*a*, said bore offers a possibility of using a fluid in a small quantity as slide bearing lubrication or in an annular flow after inserting and mounting said bearing sleeves 10,11, when operating said system M. Said bore 22*b* has a minimum depth of L10+L11. Said stepped bore 22*b*, which is also illustrated in FIG. 1*a*, is located with a portion of its bore depth in the surface portion 30*i'* (compare FIG. 3) and with a further portion in a surface portion 30*i*. By said bore, the annular flow of the fluid, which flows through the shaft bearing, is obtained. By said stepped bore, a discharge of the fluid present between the sealing and the shaft bearing in a direction towards the suction side of the microsystem is obtained, said microsystem in the present embodiment being provided as a pump. The fluid from said stepped bore 22*b*, insofar operating as a channel for said fluid, is again taken up in the fluid conducting portion 28,29,29', here in a portion 29' directing towards said microsystem by covering said channel, and is returned into said microsystem 2,3.

It is to be mentioned, that the spatial-geometrical high-precise bearing support is only provided unilaterally with respect to the shaft W, but that also a second bearing support can be provided in said fluid conveying portion 29, said second bearing support, however, not having to be as precise as said first bearing support in said sleeve 10, which is additionally effective on an axially larger length L10.

The bearing portions can be manufactured as sleeves in a rotationally symmetrical simple manner. They can also have a different geometry with regard to their outer diameter, only their inner diameter and their inner surface have to be aligned such that the rotors 40,2 (shafts and outer rotor of the microsystem) can be bearing-supported geometrically precisely and resistant to abrasion.

The described methods of inserting and positioning can also be combined.

A less solid mechanical connection can be provided for an insertion by pressing in or friction setting the sleeves 10,11, determined by a corresponding adaptation of the diameter geometries of inner space and outer surface of the sleeves. After said friction setting operation, an alignment and subsequently a bonding can be effected by an additional arrangement, so that the two methods can also be used in combination.

The combined inserting method can also be effected temporally successively. The first receiving portion with the inner surface 30*i* in the first portion of the opening 31 of the stator can be connected by a mechanical friction setting operation, in which the sleeve is precisely positioned, as shown in FIG. 3*a*. Relative to said first sleeve fixed by said method, which sleeve can then serve as an auxiliary bearing or an auxiliary arrangement, the second bearing portion (here with the sleeve 11) can be positioned in the portion L11 with the arrangement according to FIG. 4, a gap 13, illustrated in FIG. 6 being filled with an adhesive substance 12 at a circumference between the outer surface 11*a* and the inner surface 30*i'*. When said first sleeve 10 fits solidly, said second sleeve can be positioned and bonded relative to said first sleeve and consequently relative to said stator. As an alternative to said bonding operation, a pressing operation can also be used for said second operation, which corresponds to the variant described before, only temporally successively. The arrangement according is to FIG. 4 can be used for all these variants.

A combination of pressing (friction setting) and gluing (bonding) turned out to be particularly precise. Initially, the first sleeve 10 is pressed into the stator 30, the two opening portions 30*i*,30*i'* being provided as two portions of the complete opening 31, said portions being positioned eccentrically with respect to each other. After pressing in, the second support portion 11 is formed by inserting a high-precisely manufactured bearing sleeve into the housing, said bearing sleeve being in a flush surface contact with said first sleeve, at a face end surface portion 10*c* thereof. Subsequently, the position of the second sleeve relative to said first sleeve is defined by using the arrangement according to FIG. 4. Subsequently, an adhesive substance 12 is introduced into the gap 13 at the outer surface 11*a* of said second sleeve and hardened, to fix said bearing portion, i.e. to permanently connect it with said stator 30.

The rectangularity of the preceding mechanical micro-finishing of said sleeve 11 and of said sleeve 10 can provide two auxiliary bearing portions for positioning and fixing. An axial support surface 10*c* and a circumferential inner surface 10*i* which, over the arrangement according to FIG. 4, can directly influence the precise positioning of said second inserted sleeve.

The mounting order of the two sleeves 10 and 11 can also be exchanged. Firstly, said sleeve 11, which is larger in diameter, subsequently—axially supported over the support surface portion 10*c*—the longer sleeve 10 for the shaft 40. In this case, said second sleeve 10 is inserted into the lower receiving portion of the opening 31 from a coupling space 32.

It is mentioned that said mechanically precise positioning in the sense of a spatial-geometrical fixing concerns two substantial dimensions. On the one hand, the amount of the eccentricity vector "dr" as radial offset. On the other hand, the correct absolute positioning of the two bearing sleeves 10,11 in the stator 30, thus their position/alignment relative to the housing. Said position is obtained over a pin, which is mounted in the plate 51 of the arrangement 50 according to FIG. 4 and engages in said housing instead of a pin 22*a*, when mounting said bearing sleeves 10,11. Said pin is not illustrated in FIG. 4, but it is evident from the context and from the spatial/geometrical positioning of the receiving means 22*a* of FIG. 2, in which the pin 22, providing the finished assembly is marked. Said pin takes over the circumferential fixing of the fluid conveying portion 28,29,29' relative to the housing 30, which is designated as stator.

We claim:

1. A method for at least one of assembling and adjusting at least two bearing portions in a fluidal mini to micro component, said fluidal component comprising a stator and at least one rotor, said rotor being supported at one of said bearing portions relative to said stator to be rotatably supported, wherein (a) a first sleeve is inserted in said stator for forming one of said bearing portions, said first sleeve is inserted in said stator as a first bearing sleeve and comprises an inner surface and an outer surface and is comprised of one of hardened steel, ceramic and hard metal;

(b) said first bearing sleeve being prior to inserting into said stator, a separate bearing component comprising an inner bearing surface as said inner surface, and said inner surface is mechanically micro-finished prior to inserting into said stator, said microfinishing being one of grinding, honing and lapping;

(c) said outer surface of said first bearing sleeve is brought into a mechanically permanent connection with said stator; and (d) wherein a second bearing body shaped as a second bearing sleeve and having an outer surface is inserted into the said stator, to assemble and adjust the bearing portions of said fluidal component, wherein each bearing sleeve defining an own axis, as eccentric or radially offset axes relative to each other, and obtain two bearing supports in an axial distance as non-identical axial positions for a shaft and an outer rotor as said rotor;

(e) wherein said outer surfaces (10*a*,11*a*) of said first bearing sleeve (11,10) is inserted into a first receiving portion of said stator (30), said first receiving portion having a larger inner dimension, and a gap (13) or an irregular interspace between said inserted first bearing sleeve and said receiving portion is provided with a hardenable filling material (12), said filling material hardening after being filled into mechanically permanent connect said first bearing sleeve with said stator (30), and said hardening is obtained by a chemical reaction in said filling material (12).

2. The method of claim 1, wherein an outer surface (10*a*, 11*a*) of said second bearing sleeve is inserted by friction setting into a second receiving portion (30*i*,30*i*') of said stator, said second receiving portion having a smaller inner dimension, whereby a surface portion of said stator is displaced by said second bearing sleeve inserting for providing a mechanically permanent connection of said second bearing sleeve to said stator.

3. The method of claim 1, wherein said two axially spaced bearing portions (L10,L11;10,11) are provided in said stator (30), one of said bearing portions being formed by said first bearing sleeve (10) and the other of said bearing portions being formed by said second bearing sleeve (11), said first bearing sleeve and said second sleeve being fixed to said stator (30) and relative to each other by hardening of said filling material and friction setting.

4. The method of claim 2, wherein during the entire inserting operation, said second bearing sleeve is guided and supported (50) by a mechanical contact, to result in an accurately positioned bearing sleeve in said stator (30) during said friction setting.

5. The method of claim 1, wherein said first bearing sleeve (10,11) is supported in an accurate position during hardening, for obtaining an accurately positioned alignment of said supported first bearing sleeve in said stator (30) after said hardening.

6. The method of claim 1, wherein said first bearing portion is a unilateral bearing and positioned in said stator as housing.

7. The method of claim 1, wherein said first and second bearing sleeves have cylindrical shapes as outer shapes.

8. The method of claim 1, wherein said two bearing sleeves are inserted into said stator, into two axially spaced portions (30*i*,30*i*') of an inner opening (31) of said stator (30), and wherein said two portions of said inner opening (31) are positioned eccentrically with respect to each other.

9. The method of claim 1, wherein at least two axially spaced bearing portions (L10, L11; 10,11) are provided in said stator (30), one of said bearing portions being formed by said first sleeve (10) and the other of said bearing portions being formed by a said second sleeve (11), said first sleeve being fixed and said second sleeve being fixed relative to said stator (30) and relative to each other; and wherein two bearing components are inserted into said stator, into two axially spaced portions (30*i*,30*i*') of an inner opening (31) of said stator (30), and wherein said two portions of said opening (31) are designed eccentrically with respect to each other, for attributing each of two rotors to one of said two bearing components for being rotatably supported; and wherein said first bearing component (10) is provided for supporting said shaft (40), and said second bearing component (11) is provided for supporting said rotor (2).

10. The method of claim 8, wherein said first bearing component (10) has an outer diameter of an outer surface (10*a*) with a first diameter (d10*a*), and said second bearing component has an inner diameter of an inner bearing surface (11*i*) with an inner diameter (d11*i*), said inner diameter being smaller than said outer diameter, for an axial supporting surface (10*c*) between said bearing bodies (10,11) in a difference portion;

for an axial bearing surface (b,10*b*) within said inner diameter.

11. The method of claim 1, wherein said at least one bearing component is a freely shaped bearing body, having an inner surface (11*i*,10*i*) suitable for a bearing support.

12. The method of claim 1, wherein a radial offset (dr) and an inner diameter and an outer diameter (d10*a*,d11*i*) are coordinated such that said two bearing bodies contact each other circumferentially continuously at a face end, at a support surface ring (10*c*).

13. The method of claim 1, wherein first and a second bearing components (10,11) are shaped as bearing sleeves, and each defining an axis (100,101), said two bearing sleeves being mounted in a housing (30,31) as stator, to have eccentric or radially offset (dr) axes relative to each other, and to be axially offset, for obtaining a bearing support at an axial distance (dL) as said non-identical axial positions (L11,L10) for a shaft (40) and a bearing support for said outer rotor (2) as two rotors; wherein said radial offset (dr), said inner diameter, and said outer diameter of each respective sleeve are coordinated such that a circumferentially extending face end or strip portion is provided, as one of an axial support when permanently fixing said second bearing body and an operational bearing (b) of at least one of the two rotatable rotors of said microsystem.

14. The method of claim 13, wherein said strip portion as a face end surface (10*b*) does not have a constant width (b) along its circumferential extension.

15. Method for at least one of manufacturing, adapting and adjusting two bearing portions in a fluidal mini or micro system, said system comprising a stator and two rotors said rotors being rotatably supported at said bearing portions to be rotatable relative to said stator, wherein two bearing portions (L10,L11) are determined successively, one by friction setting (10*a*,10*i*) and a further one by gluing in (11*a*,11*i*), wherein prior to inserting a first separate bearing body the stator comprises a first portion not suitable for a bearing support, said portion being made of a softer material than said separate bearing body as one of a non-fitting portion or a misfit portion;

said non-suitable first portion is made suitable for bearing support by inserting the first bearing body made of a harder material with respect to the material of said stator, wherein said inserting is a forward pressing of said bearing body, thereby at least modifying an inner surface of said non suitable portion of said stator, and thereby spatially-geometrically and precisely positioning an inner surface of said bearing body as a first bearing surface for rotatably supporting said rotor, and wherein the inner surface of the bearing body being grinded, honed or lapped prior to inserting; and wherein a second separate bearing body is axially inserted into the stator by mechanical displacement and a hardening filling material is introduced into a remaining interspace present after said mechanical displacement of said second bearing body between body and stator, for obtaining a mechanical fixing and one of a spatial and geometrical positioning of said second bearing body as a bearing portion after hardening of said filling material (12).

16. The method of claim 1, wherein each bearing component has at least one of an outer diameter of less than 15 mm, and an inner diameter of less than 5 mm, for supporting the rotor, as one of an outer rotor or shaft.

17. The method of claim 15, wherein initially friction setting and thereafter gluing in takes place.

18. The method of claim 15:

wherein two bearing portions are determined successively, one by friction setting (10*a*,10*i*) and a further one by gluing in; and wherein said first bearing portion inserted by friction setting is used as an auxiliary bearing portion determined relatively to said stator, for spatially and geometrically positioning said second bearing portion prior to fixing and locating it by said hardening material.

19. The method of claim 15, wherein two bearing portions (L10,L11) are determined successively, one by friction setting (10*a*,10*i*) and a further one by gluing in;

wherein said second bearing portion (11;11*a*,11*i*) is positioned in at least one of an axial (10*b*) and a radial (10*i*,11*i*) direction, supported by said first bearing body.

20. The method of claim 1, an adhesive substance is said filling material (12) and hardened by said chemical reaction.

21. The method of claim 1, wherein said second bearing sleeve is inserted into said stator prior to said first bearing sleeve.

* * * * *

UNITED STATES PATENT AND TRADEMARK OFFICE

CERTIFICATE OF CORRECTION

PATENT NO. : 7,698,818 B2
APPLICATION NO. : 10/466792
DATED : April 20, 2010
INVENTOR(S) : Gerald Voegele et al.

It is certified that error appears in the above-identified patent and that said Letters Patent is hereby corrected as shown below:

Title Page, Item (75)
• (75) Inventors: Insert -- Thomas Weisener, Schwerin (DE) --, delete "Thomas Weisner, Schwevin (DE)"

Title Page, Item (73)
• (73) Assignee: Insert -- HNP Mikrosysteme GmbH, Parchim (DE) --, delete "HNP Mikrosysteme GmbH, Parchaim (DE)"

Signed and Sealed this

Third Day of August, 2010

David J. Kappos
*Director of the United States Patent and Trademark Office*